(12) United States Patent
Tatoh

(10) Patent No.: US 6,477,302 B2
(45) Date of Patent: Nov. 5, 2002

(54) MICROBENCH AND PRODUCING METHOD THEREFOR, AND OPTICAL SEMICONDUCTOR MODULE USING SAME

(75) Inventor: Nobuyoshi Tatoh, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 141 days.

(21) Appl. No.: 09/756,764

(22) Filed: Jan. 10, 2001

(65) Prior Publication Data

US 2001/0040240 A1 Nov. 15, 2001

(30) Foreign Application Priority Data

Jan. 12, 2000 (JP) .................................... 2000-003578

(51) Int. Cl.⁷ .............................................. G02B 6/30
(52) U.S. Cl. ............................ 385/49; 385/52; 385/88; 385/92; 385/136; 385/137
(58) Field of Search ............................... 385/31, 49, 52, 385/134, 136, 137, 139, 92, 88

(56) References Cited

U.S. PATENT DOCUMENTS

| | | | |
|---|---|---|---|
| 5,343,546 A | * 8/1994 | Cronin et al. | 385/52 |
| 5,388,119 A | * 2/1995 | Cronin et al. | 372/101 |
| 5,914,972 A | * 6/1999 | Siala et al. | 372/102 |
| 6,003,341 A | * 12/1999 | Bloom | 65/484 |
| 6,074,888 A | * 6/2000 | Tran et al. | 438/29 |
| 6,115,521 A | * 9/2000 | Tran et al. | 385/33 |
| 6,187,515 B1 | * 2/2001 | Tran et al. | 385/39 |
| 6,237,370 B1 | * 5/2001 | Bloom | 65/406 |
| 6,252,725 B1 | * 6/2001 | Tran et al. | 257/798 |
| 6,389,202 B1 | * 5/2002 | Delpiano et al. | 385/14 |
| 6,396,115 B1 | * 5/2002 | Gage et al. | 257/432 |

FOREIGN PATENT DOCUMENTS

| | | | |
|---|---|---|---|
| JP | 5-21817 | 1/1993 | 385/137 X |
| JP | 7-174941 | 7/1995 | 385/137 X |
| JP | 9-90173 | 4/1997 | 385/137 X |
| JP | 9-223806 | 8/1997 | 385/137 X |
| JP | 10-200155 | 7/1998 | 385/137 X |

OTHER PUBLICATIONS

"Packaging Technology in Lightwave Communication", S. Sasaki et al., Japan Institute of Electronics Packaging Society Publication, vol. 1, No. 2, 1998, pp. 153–158.

"A Study on a compact Package for Multichannel Multigigabit Optical Interconnection", Y. Arai et al., The Proceedings of Electronics Society Conference of IEICE on the Characteristic of High Speed Electrical Circuit on PLC–Platform, C179, 1995, p. 179.

* cited by examiner

Primary Examiner—Brian Healy
(74) Attorney, Agent, or Firm—McDermott, Will & Emery

(57) ABSTRACT

An object of the present invention is to produce and provide a microbench for achieving a highspeed, low-cost semiconductor module having a high S/N ratio. A microbench for use in mounting an optical fiber, is characterized in that a substrate comprises a ceramics having a specific resistance $10^9$ Ωcm or larger and a dielectric constant of 15 or less, a groove for mounting an optical fiber is disposed on the surface thereof, a semiconductor device mounting portion onto which an optical semiconductor is mounted is provided at the end portion of this groove, and an alignment mark for semiconductor mounting is disposed in this semiconductor device mounting portion. The above-mentioned ceramics is either AlN, or a ceramics having AlN as its principal component.

13 Claims, 8 Drawing Sheets

MICROBENCH AND PRODUCING METHOD THEREFOR, AND OPTICAL SEMICONDUCTOR MODULE USING SAME

BACKGROUND OF THE INVENTION

1. Field of the Invention

The present invention relates to a microbench, which is used to optically couple an optical fiber and an optical semiconductor device, and a manufacturing method therefor, and an optical semiconductor module, which is constituted using same.

2. Description of the Related Art

A substrate having V-groove thereon, such as that shown in FIG. 11, has been used as a self-alignment mechanism for the optical coupling of an optical fiber to an optical fiber, or an optical fiber to an optical semiconductor device (Japanese Patent Laid-open No. H5-21817). In the figure, 1 is a silicon (Si) substrate, 2 is back surface metallization, 3 are metallized interconnects, 4 is silica insulation, 5 is a AuSn deposited die area, 6 is an alignment mark, 7 is a V-groove, and 8 is a dicing line. Actually, as long as the substrate has a groove shape, it is possible to affix an optical fiber to the substrate, and a trapezoid or rectangular groove would also be capable of fully performing this function, but because V-shaped processing has been accurate in the past, a V-groove 7 has come to be used most often. Ceramics substrates and Si substrates 1 have been used as this substrate having a V-groove (Japanese Patent Laid-open No. 7-174941). The former has primarily been processed a dicing process, and the latter has been processed via a dicing process, and anisotropic etching with potassium hydroxide (KOH).

A substrate, which has this V-groove 7, and optically couples an optical semiconductor device and an optical fiber in a compact fashion by the V-groove 7 is called a microbench. Among these microbenches, those that make use of Si are called Si microbenches, and to date there have been numerous inventions that put an Si microbench into practice (Refer to "Packaging Technology in Lightwave Communication" Japan Institute of Electronics Packaging Society publication Vol. 1, No. 2, 1998).

A semiconductor laser device (laser diode (LD)) will be used as a typical example of an optical semiconductor device, and will be explained. An LD is lined up with an alignment mark on an Si microbench, and is die bonded, using an AuSn or other soldering material, to a junction down package, which provides light-emitting, light-receiving layers on the substrate side. The facet of an optical fiber is either used as-is, or is used by processing the end into a lens to enhance optical coupling efficiency. Further, there are also cases in which a non-reflective coating is applied to avoid the noise of mode disturbance resulting from reflected light. This optical fiber is affixed in a groove with either plastic or soldering material. With such a simple process, it has become possible to eliminate the time consuming, and costly laser beam welding-based aligning process that had been deemed necessary to date ("Packaging Technology in Lightwave Communication" Japan Institute of Electronics Packaging Society publication Vol. 1, No. 2, 1998).

This Si microbench is manufactured using the following process. (1) A photomask is manufactured using sub-micron order precision. The shape of this photomask is designed so that the center point of an optical fiber, which is a cylindrical shape, is on the substrate surface because of taking into account the KOH-based anisotropic etching of Si. (2) After etching, a dicing line is formed so as to form an optical semiconductor device mounting portion that is orthogonal to the groove. This is because in anisotropic etching, the vicinity of the LD mounting portion is etched in the shape of a triangular pole, and in the state following etching, the distance between the LD and the optical fiber cannot be made shorter, and the purpose is for the dicing line to bring the optical fiber right near the semiconductor device. (3) Since the Si substrate is conductive, silica glass is formed as an insulating layer on parts, which are to be electrically isolated from the semiconductor device, and thereafter, metallization is performed for the interconnects. (4) Metallization and the vapor deposition of an AuSn or other solder are carried out on the semiconductor device mounting portion (die bonding area).

An optical semiconductor module is manufactured by combining the skeletal structure, resulting from the Si microbench, LD and optical fiber, together with ceramics, a leadframe, and a plastic body, and forming an electrical connection (Refer to Japanese Patent Laid-open No. H9-223806, and Japanese Patent Laid-open No. H10-200155).

In the field of optical communications, there has been a tendency to develop large-capacity, high-speed communications in line with the popularization of the Internet and other means of multimedia communications. However, in general, there is a tendency for noise to increase when the telecommunications rate is raised, and a more excellent signal-to-noise (S/N) ratio than in the past is required for telecommunications systems. Meanwhile, lowering the junction temperature of a LD and enhancing light output has the advantage of improving the S/N ratio of a signal. For this reason, there is a need for a semiconductor system with good heat-radiating characteristics,,and a high light output LD device that makes use the system.

In the meantime, in the field of the information industry, even higher speed, higher density recording/playback capabilities are needed. In general, a blue or other such short wavelength LD required in a high-density system still has low light emitting efficiency, necessitating the improvement of the S/N ratio here as well, and to enhance the light output of such LD, there is a need for a high light output LD device that makes use of a system having good heat-radiating characteristics. In particular, even higher light output is required in a recording system than in a playback system.

High speed is a performance capability demanded of an LD. Operating an LD at the high speed of 10 gigabits per second (Gbps) will make it possible to increase capacity four-fold compared to the conventional 2.5 Gbps. For this reason, the capacitance between the substrate and the interconnects, and the inductance of the interconnects themselves, as well as interconnect resistance must be lowered. Because silica is utilized in the insulating film for a Si microbench, the thickness of the film cannot be increased. The problem is that reducing inductance increases the capacitance of the interconnects. According to the disclosure in The Proceedings of the 1995 Electronics Society Conference of IEICE on the Characteristic of High Speed Electrical Circuit on PLC-Platform, on a Study on a Compact Package for Multichannel Multigigabit Optical Interconnection C179, with the object of reducing interconnect capacitance, a thick polyimide sheet was purposely formed on top of an Si microbench, and metallization for the interconnects was formed thereupon. However, in this method, in addition to the fact that polyimide formation had to be carried out with precision thickness, the polyimide foamed during the die bonding of the semiconductor device due to the pressure of absorbed water and caused open circuits and the like, deteriorating the yield of optical semiconductor modules.

Further, because the LD discussed here is a mass production type, which is utilized in ordinary homes, costs must also be lowered. The most costly part of a LD is the Si microbench. In a case in which anisotropic etching was performed on an Si substrate, the situation was such that etching unevenness occurred on the inner surface, making it almost impossible to achieve an uniform anisotropic etching surface. This was a problem in that the optical coupling of the optical fiber and LD could not be accomplished satisfactorily. In Japanese Patent Application Laid-open No. H9-90173, there is disclosed a microbench, which is constituted by forming a plastic using a metal, or a metal and ceramics as filler to reduce the costs thereof. The problem here is that in a case in which a metal was used, interconnect capacitance increased, a polyimide sheet process became necessary, and the yield of optical semiconductor modules deteriorated, in the end, leading to increased costs. Further, in a case in which a plastic was used, in addition to the inherent problem of the [plastic] itself foaming for the reasons explained hereinabove, the problem was that thermal conductivity worsened, causing the S/N ratio to deteriorate.

SUMMARY OF THE INVENTION

An object of the present invention is to manufacture and supply a microbench for realizing a highspeed, low-cost optical semiconductor module with a high S/N ratio.

To solve for the above-mentioned problems, the present invention comprises the constitutions described hereinbelow.

(1) A microbench for use in mounting an optical fiber, comprising a substrate made of a ceramics having a specific resistance of $10^9$ Ωcm or larger and a dielectric constant of 15 or less, wherein a groove for mounting an optical fiber is formed on the surface of the substrate, there is provided a semiconductor device mounting portion onto which an optical semiconductor device is mounted at the end portion of the groove, and an alignment mark for semiconductor device mounting is disposed in the semiconductor device mounting portion.

(2) The microbench of the disclosure in the above-mentioned (1), wherein said ceramics is either AlN or one having AlN as its principal component.

(3) The microbench of the disclosures in either the above-mentioned (1) or (2), wherein a shape of said groove is either V-shaped or U-shaped.

(4) The microbench of the disclosures in either the above-mentioned (1) or (2), wherein a metallic layer with a thickness of not less than 0.1 mm and not more than 2 mm is disposed on either one surface or both surfaces of said groove and said semiconductor device mounting portion.

(5) The microbench of the disclosure in the above-mentioned (4), wherein, when said metallic layer is disposed on the groove of the substrate, a shape of the groove is unrestricted, and the surface of the metallic layer has a shape of either a V or a U.

(6) The microbench of the disclosure in the above-mentioned (4), wherein, when said metallic layer is disposed in the semiconductor device mounting portion of the substrate, the alignment mark on top of the substrate is omitted, and an alignment mark is disposed on the surface of the metallic layer instead.

(7) The microbench of one of the disclosures of the above-mentioned (4) through (6), wherein a metal of said metallic layer comprises Al as its principal component.

(8) The microbench of one of the disclosures of the above-mentioned (4) through (6), wherein a metal of said metallic layer comprises Cu as its principal component.

(9) A microbench producing method comprising:
providing a baked ceramics substrate;
placing a die on the baked ceramics substrate, the die having configurations, wherein at least one shapes selected from a group of a groove for mounting an optical fiber, a semiconductor device mounting portion and an alignment mark is inverted; and
re-baking the baked ceramics substrate at 1,400° C. or higher.

(10) The microbench producing method of the disclosure in the above-mentioned (9), wherein said baked ceramics substrate comprises AlN, said die is placed thereon under a load applied thereto, and said baked ceramics substrate is re-baked in a non-oxidizing environment.

(11) A microbench producing method comprising:
preparing a ceramics sheet in which holes have been made in an optical fiber mounting portion and another ceramics sheet in which there are no holes;
baking both ceramics sheets placed one on top of the other to prepare a ceramics having a groove;
metallizing the surface thereof to form a metalic layer;
inserting a metal chip into either said groove or a portion which will serve as a semiconductor device mounting portion, or both; and
heating at a temperature of 150° C. or higher, while at the same time impressing the ceramics, so that an optical fiber mounting portion, a semiconductor mounting portion, and an alignment mark are formed in the ceramics.

(12) The microbench producing method of the disclosure in the above-mentioned (11), wherein said ceramics sheet has AlN as its principal component, and the baking is performed at a temperature of 1,400° C. or higher.

(13) An optical semiconductor module, wherein a microbench of one of the disclosures of the above-mentioned (1) through (8) is used, an optical fiber and either a light receiving or a light emitting semiconductor device are mounted and affixed thereto using either a solder or a resin, and thereafter, are electrically connected to metallized wiring on top of said microbench, and the microbench is mounted into either a ceramics package, or a package comprising a leadframe.

FIG. 1 is an illustration of one example of the present invention, and a microbench is supplied by using for the microbench substrate 1' an AlN substrate, which shows high insulation capabilities, high radiation capabilities and low costs, and has a specific resistance of $10^9$ Ωcm or larger, and a dielectric constant of 15 or less.

In a ceramics substrate with a specific resistance of $10^9$ Ωcm or larger, and a dielectric constant of 15 or less, the metallized interconnects applied thereon excel in high frequency characteristics. In the ceramics substrate with a specific resistance of $10^9$ Ωcm or larger, power leakage from interconnects can be neglected. Thus, for this ceramics substrate 1', it is not necessary to form a silica insulation layer 4 as with a conventional Si substrate. When the silica on a Si substrate is made thick, the silica layer can peel off and/or cracks can occur, and as such, it is necessary to keep this silica layer thickness to less than 2 μm as far as possible.

For this ceramics substrate, it is possible to process same with a thickness of 2 mm or more, enabling the substrate to be made around 1,000-times thicker than the silica of the insulation layer. Since the dielectric constant of the silica is around 3, in the ceramics substrate with a dielectric constant of 15 or less, the width of interconnects in a high-frequency impedance-matching circuit, like a microstrip line, can be steadily widened, thus making it possible to reduce interconnect resistance. Further, stray capacitance was generated from the bonding pads of wires, causing high-frequency disturbance, but this, too, can be kept small by making the substrate thick. Thus, it is possible to prevent the deterioration of the S/N ratio resulting from high-frequency disturbances.

The thermal conductivity of the AlN ceramics substrate, which also satisfies the above-mentioned characteristics, is 170 W/mk or higher compared to 140 W/mk for Si, and the AlN ceramics substrate has much higher heat-radiating capabilities. Thus, it is possible to enhance light output by lowering the junction temperature of an LD. Furthermore, the dielectric loss tangent (tan$\delta$), which indicates power loss, is less than $10^{-3}$ for the AlN ceramics substrate compared to around $10^{-2}$ for a polyimide film, meaning that the AlN ceramics substrate has good high frequency transfer characteristics, and that the S/N ratio can be improved based thereon.

The shape of the groove for mounting an optical fiber can be either a V-shape or a U-shape, but in a case in which a metallic layer is disposed in the groove, as long as the surface of the metallic layer is either a V-shape or a U-shape, the shape of the groove is unrestricted.

A metallic layer of not less than 0.1 mm and not more than 2 mm thickness is provided on either one surface or both surfaces of the groove and the semiconductor device mounting portion, but this is to shape the groove by using the plastic deformation of the metal, and processing is performed after providing a metallic layer thinly when there is a shape formed on the substrate itself, and thickly when there is no particular shape thereon.

Accordingly, the thickness of the metallic layer is made to range between 0.1 mm and 2 mm. As the material, a metal including Al or Cu as the principal component is appropriate. FIG. 2 is a diagram in which a circular cylinder/optical fiber is mounted in a V-groove, and FIG. 3 is a diagram in which metallization is applied to a V-groove, and a circular cylinder/optical fiber is mounted therein. FIG. 4 is a diagram in which Al is filled into a groove, a U-groove is formed therein, and a circular cylinder/optical fiber is mounted therein, and FIG. 5 is a similar diagram in which Cu is filled into the groove.

An alignment mark for mounting a semiconductor is disposed in an optical semiconductor device mounting portion, but in a case in which the above-mentioned metallic layer is provided, the alignment mark on the ceramic substrate is omitted, and an alignment mark is provided on the surface of the metallic layer instead. FIG. 6 is an example in which alignment mark 6 is provided on substrate 1', and metallic layer 9 is provided as-is, and FIG. 7 is an example in which alignment mark 6 is omitted on substrate 1', and alignment mark 6 is provided on metallic layer 9.

To couple optically an optical device with an optical fiber on a microbench, positioning accuracy must be submicron-3 $\mu$m. This is because the core diameter of an optical fiber is 10 $\mu$m, and approximately ⅓ or more of LD light is incident on the optical fiber. Positioning accuracy in the height direction is only necessary for the distance between the die bonding area and the center of a facet of an optical fiber circumscribed by the groove, and the permissible tolerance is submicron-3 $\mu$m for this as well. Because an alignment mark can be aligned with the light emitting/receiving parts of an optical semiconductor device at a tolerance of submicron or less, positioning accuracy in the horizontal direction is only necessary for the distance from the alignment mark to the center of a facet of an optical fiber circumscribed by the groove, and this permissible tolerance is also submicron-3 $\mu$m. Since the angle of the light that can be incident in an optical fiber can be up to around +−10 degrees from a vertical line drawn to a facet of the optical fiber, the gradient of the groove and die bonding area must be held to within +−3 degrees. Accordingly, a method in which a super hard metal die is used for microprocessing is appropriate. The super hard metal die is a metal die that was processed having Mo or WC as a raw material, and is capable of three-dimensional molding at tolerances of submicron or less.

The following 2 kinds of molding methods, which utilize this metal die, can be conceived.

One is a method in which a metal die is pressed directly against the ceramics substrate after baking in a high-temperature environment, and the groove is processed by deforming the ceramics substrate itself. FIG. 8 shows a photograph of a ceramics surface after processing. It is clear from this photograph that the surface finish is smooth. In this method, a temperature of 1,400° C. or higher is necessary in an oxygen-purged nitrogen environment, and thereafter, producing a module can be performed easily by simply metallizing the interconnects and back surface.

The other one is a method in which the metal die is pressed against the ceramics substrate after bonding a Cu or Al metallic chip susceptible to plastic deformation in a location where deformation is necessary. In this producing method, there is the addition of a process for bonding a metallic chip, but molding is possible from ordinary temperature to around 300° C. Here, the Young's modulus of Al is high, and high processing precision is required of the super hard metal die. Further, the coefficient of thermal expansion is a large $23\times10^{-6}$/degC, and the thickness of the Al layer cannot be made thick due to the unconformability of thermal expansion, but this method is advantageous in that producing is facilitated since Al is susceptible to plastic deformation even at low temperatures approaching ordinary temperature. Since the Young's modulus of Cu is low, super hard metal die processing is easy, but processing must be done at a high temperature of over 250° C., where plastic deformation readily occurs. The coefficient of thermal expansion of Cu is a small $18\times10^{-6}$/degC, and in addition to the unconformability of thermal expansion being smaller than that for aluminum, it is electrically superior, having electric conductivity that is around 1.5-times that of Al.

As a formation for the groove, when baking an AlN ceramics, it is possible to make a rectangular parallelepiped groove, which is one size larger than an optical fiber, and into which a metallic chip is inserted beforehand. The substrate outfitted with this large rectangular parallelepiped groove can be manufactured by laminating a ceramics temporary compact sheet with holes therein and a ceramics temporary compact sheet with no holes, and baking same. When molding is performed after bonding an Al or other metallic portion thereupon, high-precision groove can be easily processed. The groove cross-section at this time constitutes a 2-layer structure of ceramics and metal.

During these processes, high precision submicron positioning accuracy becomes possible by building into the metal die in advance the die bonding area (the semiconductor device mounting portion), the alignment mark, and the groove. Sometimes a curvature will be formed at the end face of the groove at the part, where the die bonding area and the groove make contact, and the precision for accurately installing an optical fiber worsens. Accordingly, this part is removed by dicing.

In a case in which an optical module is manufactured using an AlN microbench, there are cases in which a leadframe is used. To achieve strength of adhesive bonding of the leadframe and Al wires at this time, Al spot vapor deposition is utilized. When manufacturing the AlN microbench, the AlN substrate, which has the groove that is one size larger than an optical fiber, and a leadframe are bonded, and thereafter, using Al spot vapor deposition, the Al portion can be simultaneously formed on both a wire bonding pad and the groove, prior to die molding. Using this method enables costs to be reduced.

Using this AlN microbench to produce an optical module enables the high yield manufacture of a highspeed, low-cost optical semiconductor module with a high S/N ratio.

In particular, producing an optical semiconductor module using the AlN microbench, which utilizes Al vapor deposition and a leadframe, makes it possible to produce an optical semiconductor module at yet lower costs by using Al wires.

DESCRIPTION OF THE PREFERRED EMBODIMENTS

The present invention will be explained in detail hereinbelow in accordance with the examples.

EXAMPLE 1

Figure 8:
FIG. 8 is an enlarged microscope photograph of a groove portion of an embodiment.

AlN was used as the ceramics. An AlN substrate with a thermal conductivity of 170 W/mk was used. Substrate thickness was 0.5 mm, and the substrate was baked and used as is without polishing. The size of the substrate was 40 mm×60 mm. A metal die was combined with a chip processed with Mo, and was shaped in a plate having protrusions on a 50 mm×70 mm surface. Here protrusions could be taken to mean a groove, an alignment mark, and a die bonding area, but only a groove and an alignment mark were used here. The AlN substrate and the metal die were placed one on top of the other, and placed on top of a Mo plate. A 10 kg weight was placed on top of the metal die. This was placed in a high-temperature furnace with a nitrogen environment, and the substrate was formed in a 1,400° C. environment. A sink of the metal die was adjusted for by making the peripheral portion of the die thick. FIG. 8 shows a photograph of the finished substrate at this time. The ability to process at submicron surface roughness precision was confirmed.

Processing precision, which can adequately align an optical device and an optical fiber, is achievable even as-is, but processing precision can be enhanced further by measuring the depth of the groove, and thereafter, polishing the AlN substrate.

At this point, the contact portion of the die bonding area and the groove was removed by dicing, and an optical fiber was accurately installed up to the end face of an optical device.

Figure 1:
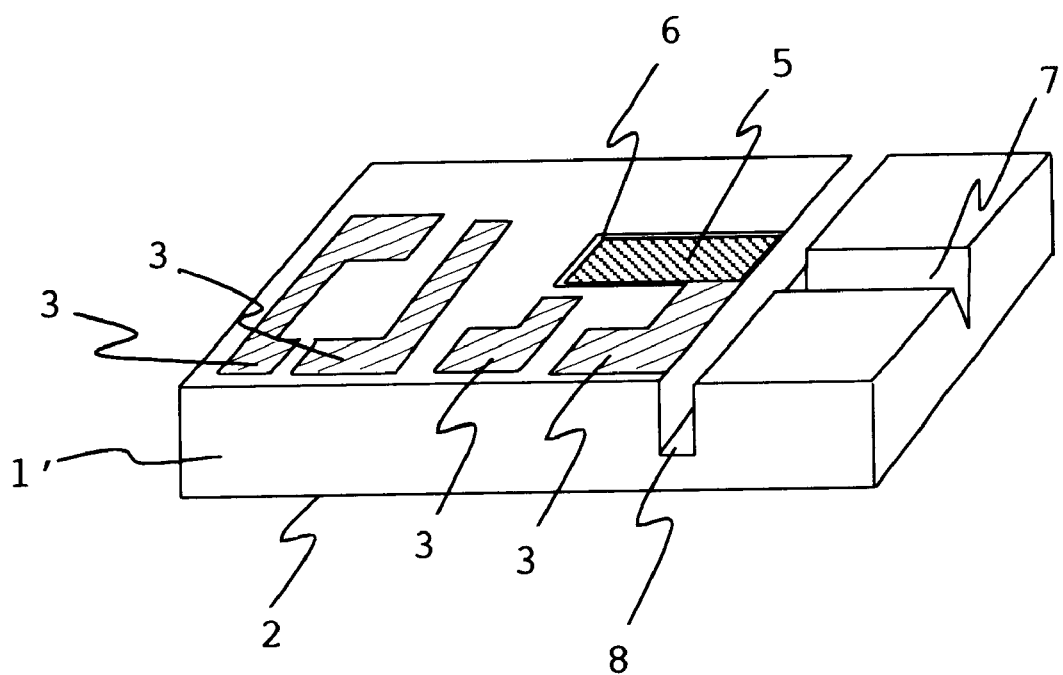
FIG. 1 is an external view of an AlN microbench of the present invention.
Figure 2:
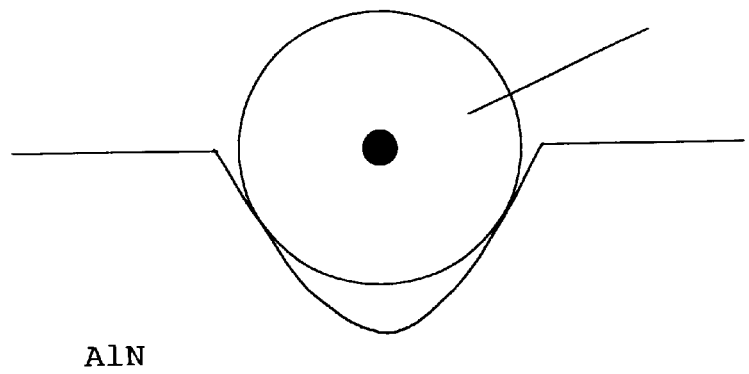
FIG. 2 is an illustration of a state in which a circular cylinder/optical fiber is mounted in a groove.
Figure 3:
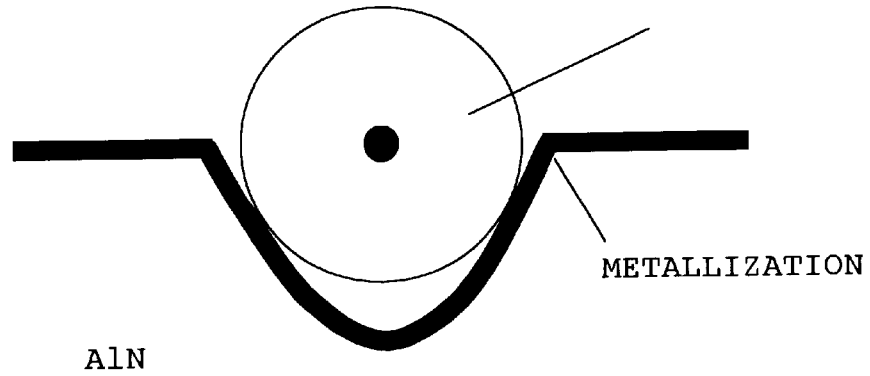
FIG. 3 is an illustration of a state in which metallization is applied to a groove, and a circular cylinder/optical fiber is mounted therein.
Figure 4:
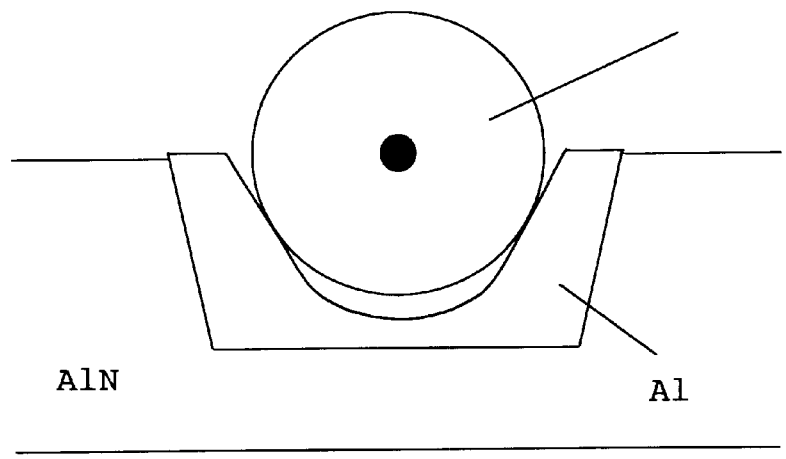
FIG. 4 is an illustration of a state in which an Al metal is filled into a groove, and a circular cylinder/optical fiber is mounted therein.
Figure 5:
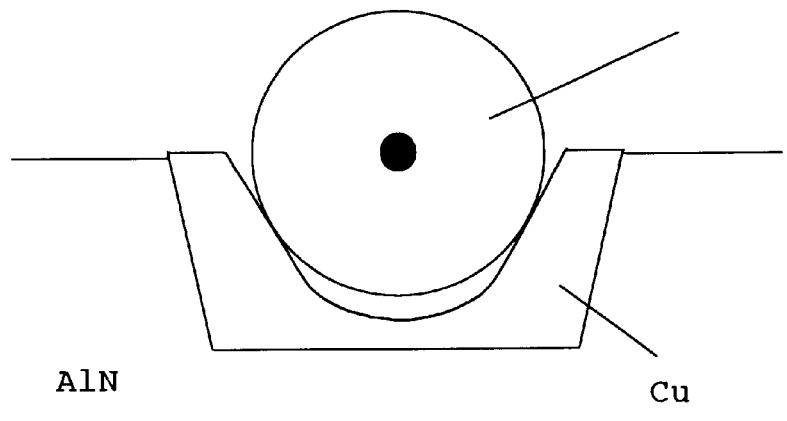
FIG. 5 is an illustration of a state in which a Cu metal is filled into a groove, and a circular cylinder/optical fiber is mounted therein.
Figure 6:
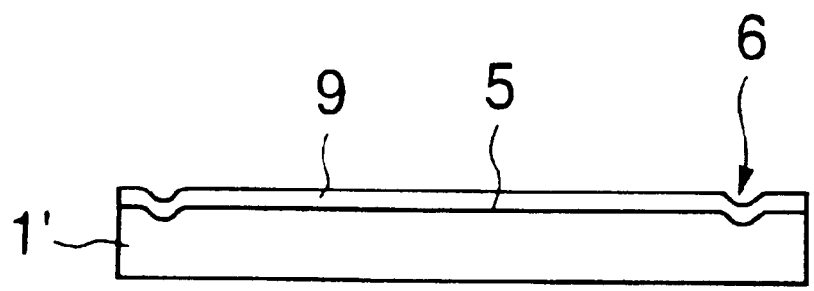
FIG. 6 is a schematic diagram of an example of an alignment mark.
Figure 7:
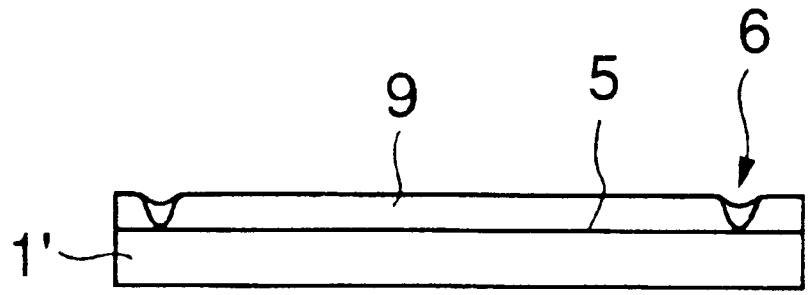
FIG. 7 is a schematic diagram of another example of an alignment mark.

The surface (back surface) on which there was no groove of the die-formed substrate was polished, the thickness of the substrate was processed to 0.3 mm, a W/Mo/Ni was metallized over the entire surface by vapor deposition, and thereafter, a Ni/Au was plated. On the groove processed surface of the die-formed AlN substrate, a photomask was used, and Ti/Pt/Au metallized interconnect was processed via vapor deposition. Signal interconnects were constituted of a microstrip line structure. For impedance matching resistance, a thin film of Cr was used, and the resistance value was adjusted by trimming. Vapor deposition was used to deposit 3 μm of AuSn onto a LD mounting portion on top of the AlN microbench. An optical fiber is affixed with resin to the groove of the AlN substrate that did not undergo metallization (FIG. 2). This is to increase the strength of adhesive bonding. For an AlN substrate with a metallized groove (FIG. 3), an optical fiber can be affixed with either solder or resin, but soldering makes possible a stronger bond. Cutting this AlN substrate to a 4 mm×6 mm size using dicing completed the AlN microbench.

First, a LD was die bonded junction down on top of the AlN microbench. The LD was a distribution feed-back (DFB) laser diode with a built-in modulator. The electrode pad for signals was made as small as possible. An alignment mark in the die bonding area and a mark on the back surface of the LD (side that does not have an active layer) were matched up at this time. Next, an AuSn pre-form was used to die bond a light receiving device. This light receiving device is for monitoring the light output of the LD. Furthermore, a facet of the optical fiber was temporarily affixed in a manner, which brought it as close to the LD as possible, and an ultraviolet light hardening resin for indexmatching was applied to the groove. Ultraviolet light was applied to the plastic, and the optical fiber, the periphery of which had been coated with Ti/Pt/Au, was affixed. The metallization of the optical fiber was for use in subsequent soldering.

This temporary compact was die bonded using PbSn to a butterfly-type flat package, which utilizes 10 alumina ceramics pins. From the standpoints of thermal expansion matching and radiation capabilities, it is desirable that this ceramics be AlN. At this time, the optical fiber, which had been attached with a metal guide, was run outside of the package via an optical fiber transmission hole, which existed in the butterfly flat package beforehand. At die bonding, solder was applied to the optical fiber, and the guide was soldered to the package together. At this point in time, the package was made sufficiently airtight. An electrical connection was made using wire bonding, and thereafter, a cap was applied by seam welding, and an optical semiconductor module was completed.

This optical semiconductor module was confirmed to have a good S/N ratio, and to be capable of satisfactory operation at a high speed of 10 Gbps.

EXAMPLE 2

An AlN ceramics (AlN) substrate with a thermal conductivity of 170 W/mk was used. The AlN producing method will be explained. First, AlN powder, a glass auxiliary, and a plastic binder were mixed together with an organic solvent, and a sheet was formed. This sheet was dried, and made into a plate, that was a temporary compact. For one plate, press was used to open a longitudinal hole 0.3 mm or more in width, and another hole-less plate was laminated thereto. This plate was baked at 1,700° C. in a nitrogen environment, and a substrate was completed. The substrate thickness was 0.7 mm.

The size of the AlN substrate after baking was 40 mm×40 mm. A method for bonding either a Cu or an Al metal plate to this AlN substrate will be described. In the case of Cu, first, a photomask was used to apply Ti/Mo/Ni metallization to the AlN substrate surface on which there was the 0.3 mm wide groove, and then NiP was plated. Thereafter, a 0.1mmt-thick Cu chip was mounted on a die bonding area, and a 0.2 mmt-thick Cu chip was mounted on the groove portion, and the Cu was bonded to the AlN substrate by heating in a hydrogen environment. In this case, the Ni and Ni-plated Cu can be bonded with silver solder. Thereafter, the die bonding area, an alignment mark, and the groove were simultaneously formed by pressing the metal with a super hard metal die of tungsten carbide. In this case, there was one die, and a plurality of grooves on the entire surface of the substrate was processed by substrate feed. The processing temperature can be ordinary temperature, but it is desirable to process at 150° C. or higher. Thereafter, gold was plated on all metallized surfaces, and thereafter, AuSn vapor was deposited, and an AlN microbench was completed.

In a case in which Al was used, first, Al spot vapor deposition was performed on a groove portion and a die bonding area. Al was also deposited via vapor deposition on a wire bonding pad at this time. Thereafter, an AlSi soldering material was used to mount a 0.15 mmt-thick Al chip to the die bonding area, and a 0.15 mmt-thick Al chip to the groove portion, and the Al chips were bonded by heating in a high vacuum. Instead of a soldering material, either AlSi or Si can be deposited by vapor deposition on one side of an Al chip. Further, an alignment mark can also be formed on Ni metallization without bonding an Al chip to the die bonding area, or Al vapor deposition. Thereafter, the die bonding area, an alignment mark, and the groove were simultaneously formed by pressing with a super hard metal die of tungsten carbide. Here, in this case, there was one die, and press for a plurality of grooves on the entire surface of the substrate was implemented by substrate feed. The processing temperature can be ordinary temperature, but it is desirable to press at around 300° C. A photomask was used to metallize Ti/Pt/Au to the AlN substrate surface on which there was the groove, 3 $\mu$m of AuSn was deposited by vapor deposition on the LD mounting portion, and an AlN microbench was completed.

Figure 9:
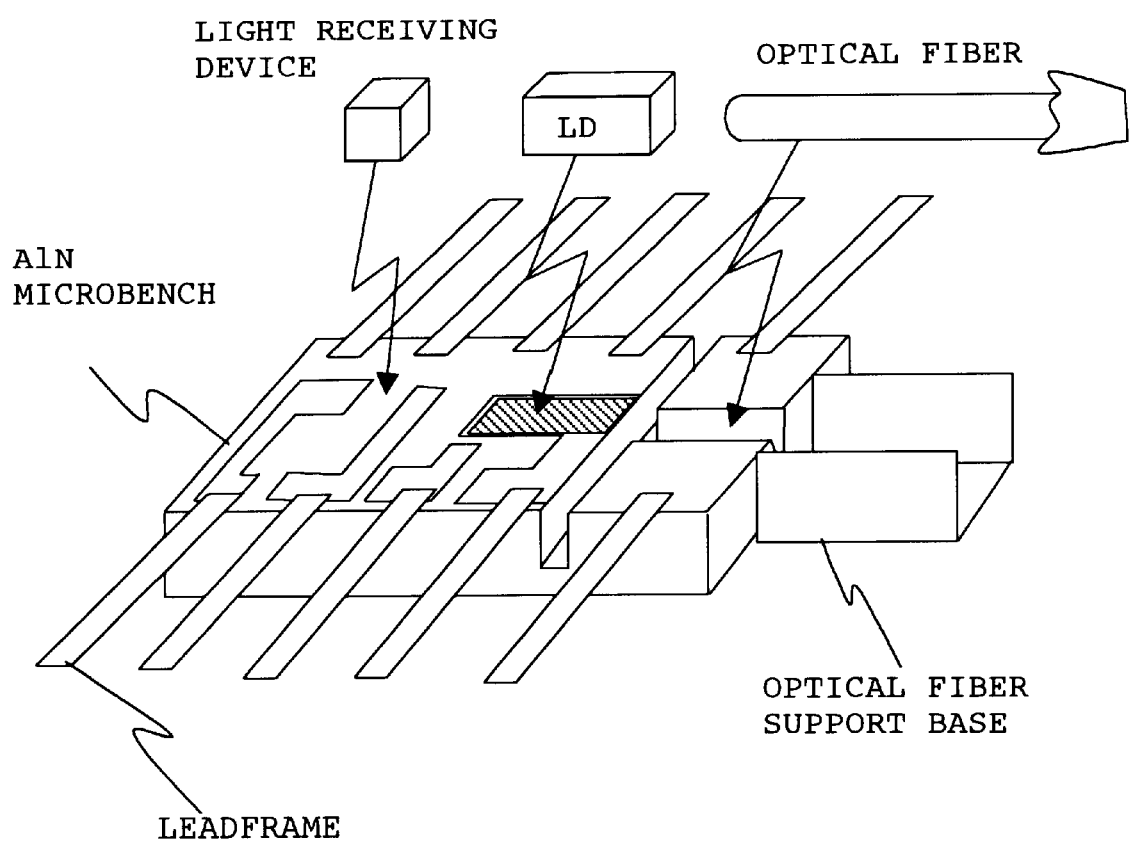
FIG. 9 is a schematic diagram of the preparation of an optical semiconductor module of the present invention.

First, a Fabry-Perot (FP) LD was die bonded junction down on top of the AlN microbench. The alignment mark in the die bonding area and a mark on the back surface of the LD (side that does not have an active layer) were matched up at this time. Next, an AuSn pre-form was used to die bond a light receiving device (Refer to FIG. 9). This light receiving device is for monitoring the light output of the LD. Furthermore, a facet of the optical fiber was temporarily affixed in a manner, which brought it as close to the LD as possible, and the optical fiber was affixed using a soldering material. Characteristics are improved by lens processing, a non-reflective coating, or a diagonal polishing on a facet of the optical fiber.

Figure 10:
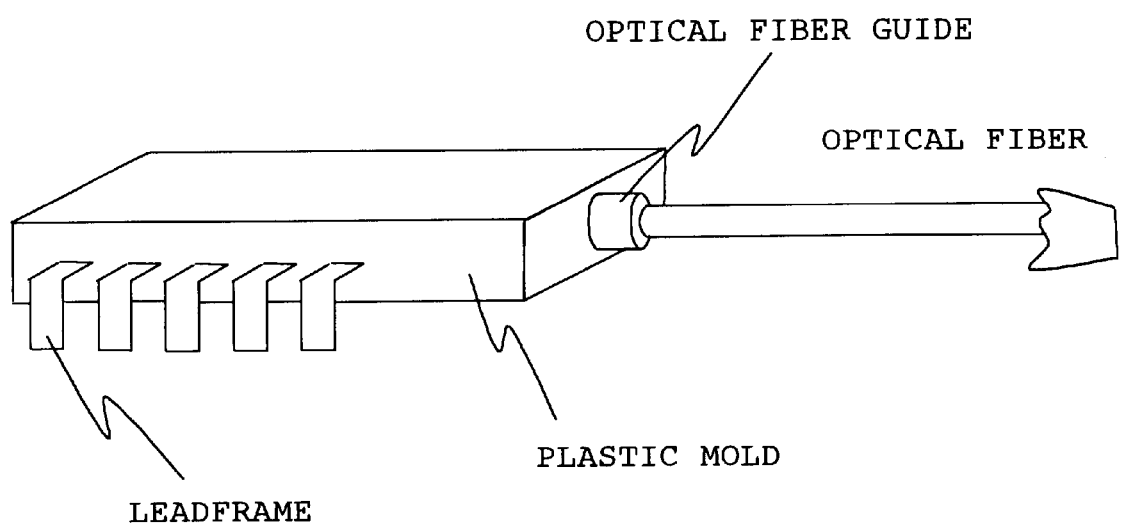
FIG. 10 is a schematic diagram of a completed optical semiconductor module of the present invention.
Figure 11:
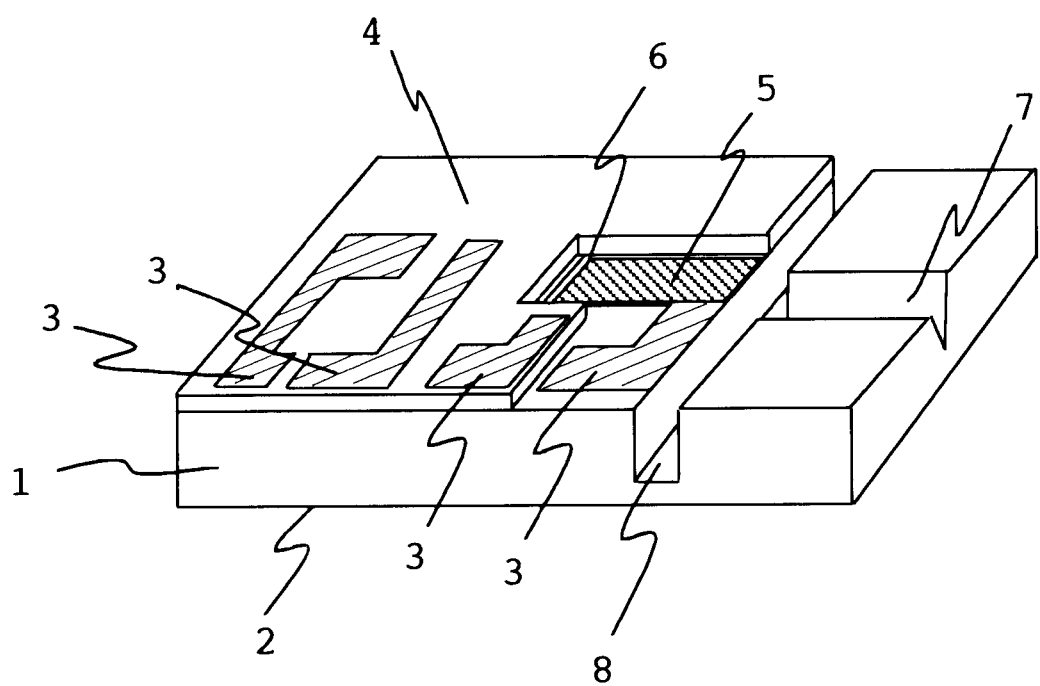
FIG. 11 is an external view of a conventional Si microbench.

Thereafter, Si gel was applied on an optical semiconductor device and the optical fiber mounting portion, and after hardening, molding with an epoxy resin, and an optical semiconductor module was completed (Refer to FIG. 10).

In addition to making it possible to lower the cost of a microbench, a drop in yield caused by polyimide foaming and the like did not occur, and an optical semiconductor module could be satisfactorily produced. It was confirmed that this optical semiconductor module had a high S/N ratio, had improved light output that is 3% better than that of a Si microbench, and operated satisfactorily at a high speed of 2.5 Gbps.

By skillfully bonding and combining either Cu or Al with a ceramics, in particular an AlN ceramics, with a specific resistance of $10^9$ Ωcm or larger and a dielectric constant of 15 or less, it is possible to manufacture and supply an AlN microbench for an optical semiconductor module. In addition to making it possible to lower the cost of a microbench, a drop in yield caused by polyimide foaming and the like did not occur, and an optical semiconductor module could be satisfactorily manufactured.

Further, this optical semiconductor module was confirmed to have a good S/N ratio, to have light output that is 3% higher than that of a Si microbench, and to operate satisfactorily at a high speed of 2.5 Gbps. In a case in which a butterfly-type flat package made of ceramics was used, it was possible to achieve highspeed operation of 10 Gbps.

It is possible to manufacture and supply a microbench for achieving a highspeed, low-cost optical semiconductor module with a high S/N ratio.

What is claimed is:

1. A microbench for use in mounting an optical fiber, comprising a substrate made of a ceramics having a specific resistance of $10^9$ Ωcm or larger and a dielectric constant of 15 or less, wherein a groove for mounting an optical fiber is formed on the surface of the substrate, there is provided a semiconductor device mounting portion onto which an optical semiconductor device is mounted at the end portion of the groove, and an alignment mark for semiconductor device mounting is disposed in the semiconductor device mounting portion.

2. A microbench according to claim 1, wherein said ceramics is either AlN or one having AlN as its principal component.

3. A microbench according to claim 1, wherein a shape of said groove is either V-shaped or U-shaped.

4. A microbench according to claim 1, wherein a metallic layer with a thickness of not less than 0.1 mm and not more than 2 mm is disposed on either one surface or both surfaces of said groove and said semiconductor device mounting portion.

5. A microbench according to claim 4, wherein, when said metallic layer is disposed on the groove of the substrate, a shape of the groove is unrestricted, and the surface of the metallic layer has a shape of either a V or a U.

6. A microbench according to claim 4, wherein, when said metallic layer is disposed in the semiconductor device mounting portion of the substrate, the alignment mark on top of the substrate is omitted, and an alignment mark is disposed on the surface of the metallic layer instead.

7. A microbench according to claims 4, wherein a metal of said metallic layer comprises Al as its principal component.

8. A microbench according to claims 4, wherein a metal of said metallic layer comprises Cu as its principal component.

9. A microbench producing method comprising:

providing a baked ceramics substrate;

placing a die on the baked ceramics substrate, the die having configurations, wherein at least one shapes selected from a group of a groove for mounting an optical fiber, a semiconductor device mounting portion and an alignment mark is inverted; and re-baking the baked ceramics substrate at 1,400° C. or higher.

10. A microbench producing method according to claim 9, wherein said baked ceramics substrate comprises AlN, said die is placed thereon under a load applied thereto, and said baked ceramics substrate is re-baked in a non-oxidizing environment.

11. A microbench producing method comprising:

preparing a ceramics sheet in which holes have been made in an optical fiber mounting portion and another ceramics sheet in which there are no holes;

baking both ceramics sheets placed one on top of the other to prepare a ceramics having a groove;

metallizing the surface thereof to form a metalic layer;

inserting a metal chip into either said groove or a portion which will serve as a semiconductor device mounting portion, or both; and heating at a temperature of 150° C. or higher, while at the same time impressing the ceramics, so that an optical fiber mounting portion, a semiconductor mounting portion, and an alignment mark are formed in the ceramics.

12. A microbench producing method according to claim 11, wherein said ceramics sheet has AlN as its principal component, and the baking is performed at a temperature of 1,400° C. or higher.

13. An optical semiconductor module, wherein a microbench according to claims 1 is used, an optical fiber and either a light receiving or a light emitting semiconductor device are mounted and affixed thereto using either a solder or a resin, and thereafter, are electrically connected to metallized wiring on top of said microbench, and the microbench is mounted into either a ceramics package, or a package comprising a leadframe.

* * * * *